United States Patent Office 3,085,045
Patented Apr. 9, 1963

3,085,045
METHOD OF DESTROYING MICROORGANISMS EMPLOYING A PHENYLMERCAPTOALKYL ISOTHIOCYANATE
George E. Lukes, Irvington, N.Y., and Thomas C. Allen, Jr., Sunnyvale, Calif., assignors to Stauffer Chemical Company, New York, N.Y., a corporation of Delaware
No Drawing. Filed Sept. 27, 1961, Ser. No. 141,008
11 Claims. (Cl. 167—30)

This invention relates to a method of controlling the growth of microorganisms such as fungi, bacteria and the like by means of certain arylmercaptoalkyl isothiocyanates. The invention also pertains to the formulation, use and application of microbiocides, incorporating as the active principle thereof at least one of the aforesaid arylmercaptoalkyl isothiocyanates.

It is known in the art to utilize organic isothiocyanates as a means of inhibiting or otherwise controlling the growth of microorganisms such as those of the type exemplified by fungi, bacteria and the like. For instance, methylisothiocyanate is a toxicant commonly used for this purpose. More recently benzyl isothiocyanate has been proposed as a fungicide and, in this connection, reference is made to British Patent 825,693. Other organic isothiocyanates have been reported as exhibiting varying degrees of biocidal activity.

With a view to improving the toxic properties of organic isothiocyanates, we have experimented with compounds which in addition to an isothiocyanate function, contain a substituted mercapto grouping, specifically a phenyl mercapto group. These dual function structures have proved to be exceptionally potent in inhibiting the growth of microorganisms and are thus valuable in formulating new and useful pesticidal compositions.

It is therefore a primary object and aim of this invention to provide microbiocidal compositions, having as their active component at least one of the aforedescribed dual function isothiocyanates. Another important object of the invention is to provide a method of preparing, using and applying such compositions. Other objects and purposes will become apparent as the description proceeds.

The compounds of this invention can be depicted formalistically by the general formula as given below:

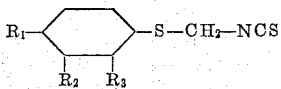

wherein at least one of $R_1$, $R_2$ and $R_3$ represents hydrogen; lower alkyl; halogen e.g. bromine, chlorine etc.; a halomethyl group, e.g. fluoromethyl, dichloromethyl, trifluoromethyl etc.; a lower alkoxy group e.g. methoxy, ethoxy, n-propoxy, isopropoxy, sec-butoxy, n-butoxy etc.; and nitro.

As examples of structures falling within the ambit of the aforementioned formula, the following list is typical.

Compound 1:

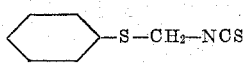

Compound 2:

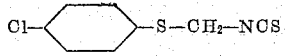

Compound 3:

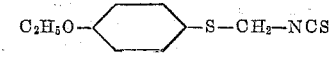

Compound 4:

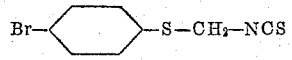

Compound 5:

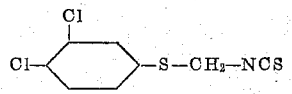

Compound 6:

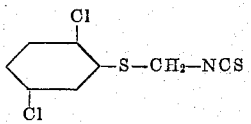

Compound 7:

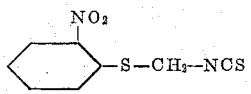

Compound 8:

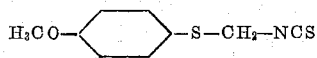

Compound 9:

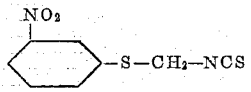

Compound 10:

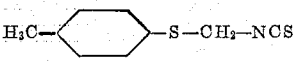

Compound 11:

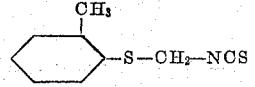

Compound 12:

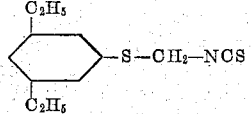

Compound 13:

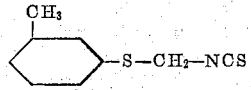

Compound 14:

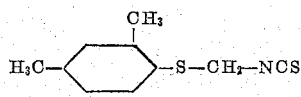

Compound 15:

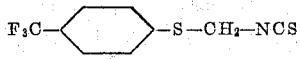

Compound 16:

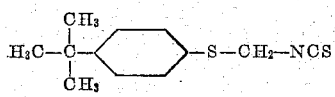

Compound 17:

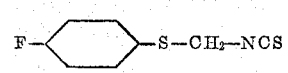

Compound 18:

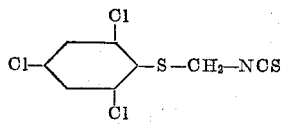

Compound 19:

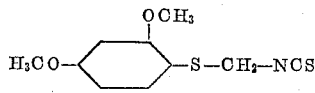

Compound 20:

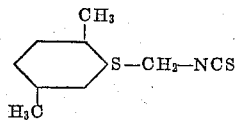

The isothiocyanates of the type proposed herein are, in some cases, known chemical entities and their description and preparation is detailed in the technical literature. In general, these compounds are formed by the chloromethylation of a thiophenol, the reaction conditions being so adjusted that chloromethylation occurs at the sulfur atom of the thiophenol. The resulting S-chloromethylated product is next reacted with a metal thiocyanate such as an alkali metal thiocyanate whereby there is obtained an arylmercaptomethyl thiocyanate. The latter component is then isomerized to the isothiocyanate structure by any number of well known procedures although heating is a method commonly employed to achieve this. Since arylthiophenols and numerous substituted derivatives thereof are well known chemical compounds and their chloromethylation can be easily carried out, the arylsulfonylmethyl isothiocyanates of this invention are obtainable whenever the aforesaid thiophenols can be procured.

In using the isothiocyanate toxicants as contemplated herein, it is merely necessary to contact them with the microorganism, the growth of which it is desired to control. This can be accomplished by various techniques and procedures which are commonly employed in the pesticidal art. For instance, in vitro tests were conducted to measure the fungitoxicity of the herein contemplated toxicants when placed in contact with growing fungus or bacteria. In this procedure 1 oz. bottles are partially filled with 10 ml. of malt or nutrient broth and capped with aluminum foil, sterilized and maintained for the test. A compound is then injected by means of a syringe through the foil and into the broth followed by inoculation with a water suspension of spores. The bottles are then sealed and held for one week before the results are evaluated.

A foliage fungicide test is conducted in order to ascertain the protectant action as well as eradicant and leaf systemic action of the test compounds. The particular type of action which is produced by the test compound is determined by evaluation tests. Pinto bean plants are sprayed with various concentrations of the toxicant and, after drying, the plants are inoculated with bean rust or powdery mildew spores. Rust infection requires an overnight treatment in a moisture chamber following inoculation.

An agar plate fumigation test is carried out to determine whether the vapor of the compound is fungicidal. Approximately 0.1 gram of the toxicant is placed in an 0.5 ml. micro beaker which is then located in a Petri dish of hardened potato dextrose agar. *Aspergillus niger* spores are dusted over the agar surface and, after one week, the growth of fungus is observed and recorded.

The results of carrying out the above described tests, using the isothiocyanate toxicants of this invention, are reported in the table below.

Table

[Approximate LD50 concentrations in p.p.m.]

| Compound | Fungi | | | | | Bacteria | | | Fumigant |
|---|---|---|---|---|---|---|---|---|---|
| | Aspergillus | Penicillium | Rhizopus | Rhizoctonia | Fusarium | E. Coli | E. Amylovera | S. Aereus | Aspergillus |
| 1 | *5 | *5 | 25 | | | 5 | 5 | 10 | 100(X) |
| 2 | *5 | *5 (B) | *50 (S) | 110 | 13 | 5 | 5 | 10 | 0 |
| 4 | *50 | *50 | | >110 | >110 | | | | 0 |
| 5 | *5 | *5 | | >110 | 55 | | | | 100 |
| 8 | *5 | *5 | | >110 | 27 | | | | 100 |
| 10 | *50 | *50 | | >110 | 13 | | | | 100 |
| 11 | *50 | *50 | | >110 | >110 | | | | 100 |
| 13 | *50 | *50 | | >110 | 27 | | | | 100 |
| 14 | *50 | *50 | | >110 | 55 | | | | 100 |
| 16 | *50 | *50 | | >110 | >110 | | | | 100 |
| 20 | *50 | *50 | | >110 | | | | | 100 |

*=Lowest concentration tested.
(B) Botrytis.
(S) Stemphylium.
(X) Percent inhibition.

We claim:

1. A method of inhibiting the growth of microorganisms which comprises applying thereto a small but effective amount of a phenylmercaptoalkyl isothiocyanate of the type represented by the following general formula:

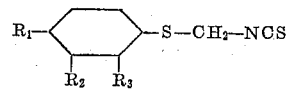

wherein $R_1$, $R_2$ and $R_3$ are each selected from the class consisting of hydrogen, lower alkyl, halogen, halomethyl, lower alkoxy and nitro.

2. A method of inhibiting the growth of microorganisms which comprises applying thereto a small but effective amount of a phenylmercaptoalkyl isothiocyanate of the following formula:

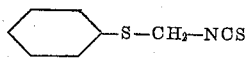

3. A method of inhibiting the growth of microorganisms which comprises applying thereto a small but effective amount of a phenylmercaptoalkyl isothiocyanate of the following formula:

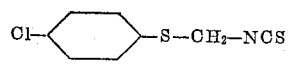

4. A method of inhibiting the growth of microorganisms which comprises applying thereto a small but effective amount of a phenylmercaptoalkyl isothiocyanate of the following formula:

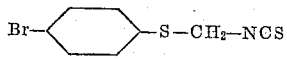

5. A method of inhibiting the growth of microorganisms which comprises applying thereto a small but effective amount of a phenylmercaptoalkyl isothiocyanate of the following formula:

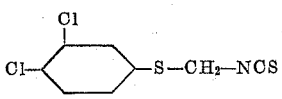

6. A method of inhibiting the growth of microorganisms which comprises applying thereto a small but effective amount of a phenylmercaptoalkyl isothiocyanate of the following formula:

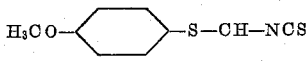

7. A method of inhibiting the growth of microorganisms which comprises applying thereto a small but effective amount of a phenylmercaptoalkyl isothiocyanate of the following formula:

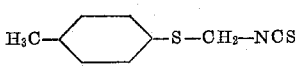

8. A method of inhibiting the growth of microorganisms which comprises applying thereto a small but effective amount of a phenylmercaptoalkyl isothiocyanate of the following formula:

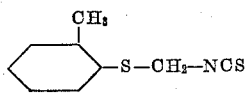

9. A method of inhibiting the growth of microorganisms which comprises applying thereto a small but effective amount of a phenylmercaptoalkyl isothiocyanate of the following formula:

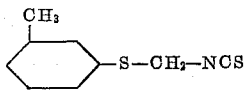

10. A method of inhibiting the growth of microorganisms which comprises applying thereto a small but effective amount of a phenylmercaptoalkyl isothiocyanate of the following formula:

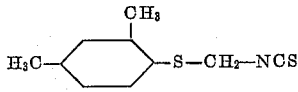

11. A method of inhibiting the growth of microorganisms which comprises applying thereto a small but effective amount of a phenylmercaptoalkyl isothiocyanate of the following formula:

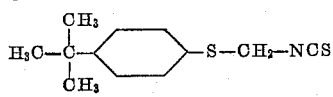

References Cited in the file of this patent
UNITED STATES PATENTS

| | | |
|---|---|---|
| 2,239,080 | Coleman | Apr. 22, 1941 |
| 2,802,769 | Stryk | Aug. 13, 1957 |
| 2,919,224 | Heininger | Dec. 29, 1959 |